(12) United States Patent
Pratt

(10) Patent No.: US 6,901,265 B2
(45) Date of Patent: May 31, 2005

(54) MOBILE COMMUNICATION APPARATUS

(75) Inventor: Anthony R Pratt, Brixworth (GB)

(73) Assignee: Parthus (UK) Limited (GB)

( * ) Notice: Subject to any disclaimer, the term of this patent is extended or adjusted under 35 U.S.C. 154(b) by 505 days.

(21) Appl. No.: 10/132,821

(22) Filed: Apr. 25, 2002

(65) Prior Publication Data

US 2003/0017834 A1 Jan. 23, 2003

Related U.S. Application Data

(60) Provisional application No. 60/317,017, filed on Sep. 5, 2001.

(30) Foreign Application Priority Data

Apr. 25, 2001 (GB) .............................................. 0110156

(51) Int. Cl.[7] ................................................ H04Q 7/20
(52) U.S. Cl. ................................ 455/456.6; 455/456.1; 455/404.2
(58) Field of Search ................................ 455/255, 440, 455/456; 375/148, 200

(56) References Cited

U.S. PATENT DOCUMENTS

| 5,093,800 | A | 3/1992 | Ifune |
| 5,440,491 | A | 8/1995 | Kawano et al. |
| 5,841,396 | A | 11/1998 | Krasner |
| 5,959,575 | A | 9/1999 | Abbott |
| 6,041,222 | A | 3/2000 | Horton et al. |
| 6,133,874 | A | 10/2000 | Krasner |
| 6,178,195 | B1 | 1/2001 | Durboraw, III et al. |
| 6,650,879 | B1 * | 11/2003 | Underbrink ................. 455/255 |

FOREIGN PATENT DOCUMENTS

| EP | 1 092 987 A2 | 4/2001 |
| EP | 1 122 553 A2 | 8/2001 |
| GB | 2 307 812 A | 6/1997 |
| JP | 113860 | 5/1995 |
| WO | WO 98/25158 | 6/1998 |

* cited by examiner

*Primary Examiner*—Joseph Mancuso
*Assistant Examiner*—Marisol Figueroa
(74) *Attorney, Agent, or Firm*—Kilpatrick Stockton LLP

(57) ABSTRACT

In a mobile unit housing a two-way communications subsystem and a satellite positioning system (SPS) receiver subsystem, the communications subsystem includes a training signal generator for generating a training signal mimicing a positioning signal transmitted by a remote SPS transmitter. The training signal is frequency-coupled to a reference frequency source contained within and used by the communications subsystem, which source is, itself, stabilized by means of communication with a remote station, e.g. a base station in a cellular telephone system. In a training sequence, the training signal is activated and coupled into the SPS receiver subsystem, and a replica signal generator for generating a carrier replica signal for position-fixing purposes is controlled so as to bring the carrier replica signal into aliment with the training signal. Information representative of the control setting of the replica signal generator corresponding to such alignment is stored. Subsequently in a searching sequence, the training signal is deactivated and the replica signal generator is set to a setting based on the stored information for acquisition and processing of positioning signals from remote SPS transmitters.

40 Claims, 5 Drawing Sheets

MOBILE COMMUNICATION APPARATUS

CROSS REFERENCE TO PRIOR RELATED CASES

This application claims benefit of U.S. Provisional Patent Application No: 60/317,017, filed on Sept. 5, 2001.

This invention relates to mobile apparatus for receiving satellite positioning signals, to methods of estimating a tuning error of a positioning receiver, and to a communications system.

Many mobile communication devices require the capability to determine their location Some of these devices have this capability for the purpose of locating the originator of emergency-related telephone calls. Increasingly, these devices are associated with mobile commerce and information services. Location knowledge can be an important element in the data transaction between a customer and a supplier in that it allows location dependent access to local suppliers, minimising time and/or cost to provide a required service or goods. An essential element in the provision of such emergency and commercial services is the provision of a two-way communication link. This may take one of several forms, such as a packet radio system or a cell-based wireless telephone communication system.

Location fixes can be provided using a Satellite Positioning System (SPS) in which signals are received from orbiting satellites or from equivalent ground-based transmitters (known as pseudolites) which emit positioning signals. The requirements of SPS receivers often include the capability to operate in an intermittent mode (to minimise power consumption) and the capability to operate a security policy, allowing access to location information only by authorised users. In the intermittent mode of operation, a key feature in the start-up sequence is the search for signals from satellites of the SPS satellite constellation. Most SPS satellites provide identification signals based on the principles of code-division multiple access. GPS satellites typify this approach, and it is expected that the Galileo system will also adopt this technique. Glonass instead uses a frequency division multiple access technique, which provides similar results using an alternative, but otherwise equivalent, mechanism.

There are a number of key parameters the knowledge of which is required by an SPS receiver for satellite signal reception. These parameters are: the identity of the satellites above the user's horizon, codes used by those satellites, the pseudo-range offsets required to tune the SPS receiver to the satellites, codes, and the frequency offsets required to tune the SPS receiver to the satellites' signals. The frequency offsets are a combination of several effects, namely: Doppler frequency offsets caused by user motion, receiver reference oscillator frequency errors, and satellite Doppler frequency offsets.

Estimates of satellite Doppler frequency are position dependent and therefore have additional errors if the location at which estimates are computed is different from the location of the mobile user of this information. This effect would be observable, for example, if a satellite Doppler estimate were computed at the base station of a cell-based wireless communication system and broadcast to all nearby mobile users. Doppler frequency offsets caused by satellite and user motion are resolved along the user to satellite line of sight (LOS) vector, and are individual to each satellite-user combination. However, errors in the SPS receiver's reference frequency are common to all received signals from every satellite transmitter.

Communication systems typically are subject to strict requirements concerning the frequency of the transmitted signals at each end of the communications link (if two-way) or at the transmitter (if one-way), to minimise the effects of interference between adjacent frequency bands or channels. Typically, at least one end of a two-way communications link includes a temperature controlled or temperature compensated quartz oscillator, which provides a stable precision frequency reference signal. Such a precision frequency reference source is used at each base station of a cell-based telephone system, and is often used by a mobile telephone to stabilise its internal reference oscillator. This may involve calibration or tracking loop techniques such as phase lock loop or frequency lock loop. These techniques may involve determining the data sent to frequency synthesisers, the data being dependent on the measurement of the frequency error of the reference oscillator of the mobile telephone.

The effect of such control systems in the mobile communications device is to transfer to a large extent the accuracy of the base station precision frequency reference to the mobile device. This effect is used in the receivers described in U.S. Pat. No. 5,841,396; U.S. Pat. No. 6,133,874 and U.S. Pat. No. 6,041,222.

According to a first aspect of the invention, there is provided mobile communication apparatus having a position-fixing capability, wherein the apparatus comprises: a two-way communications subsystem having a first signal source for producing a signal having a precision reference frequency, a training signal generator for Generating a pilot signal at an output thereof, the training signal generator having an input coupled to an output of the first signal source so that the pilot signal is linked to the reference frequency; and a satellite positioning system (SPS) receiver subsystem comprising: at least one signal path; a coupling between the signal path and the training signal generator output; an antenna for applying to the signal path positioning signals received from SPS transmitters; a carrier signal replica generator for generating a replica signal being a replica of a positioning signal received from an SPS transmitter; and a control system operable to cause the carrier signal replica generator to bring the replica signal into alignment with the pilot signal when the pilot signal is received by the SPS receiver subsystem and to store information representative of a setting of the replica generator occurring at the time of the alignment; the control system being further operable to cause the SPS receiver subsystem to search for positioning signals transmitted by an PS transmitter according to the setting information.

The pilot signal is preferably modulated with a signal of a type modulated onto the positioning signals to be received by the SPS receiver subsystem so that the pilot signal mimics an SPS positioning signal and is processed in the SPS receiver subsystem signal path. The pilot signal may have a carrier signal which is a radio frequency signal at a frequency at least approximately equal to the frequency or frequencies of the SPS positioning signals. Alternatively, the pilot signal may have a carrier frequency at least approximately equal to an intermediate frequency of the SPS receiver subsystem so that it can be picked up in the intermediate frequency stages of the SPS receiver subsystem and then processed as if it was an SPS positioning signal.

Whether the pilot signal is transmitted at a frequency in the region of the transmission frequency of the SPS positioning signals or in the region of the receiver subsystem intermediate frequency, it may include a predetermined frequency offset from the transmission frequency or an intermediate frequency respectively. This offset may be "designed in" for reasons of system convenience e.g. insofar as the precision reference frequency of the communications subsystem may not permit a whole-number multiple to be obtained which matches the respective frequency of signals in the SPS receiver subsystem. Alternatively, an offset may be introduced to reduce the possibility of interference between the pilot signal and wanted SPS positioning signals. The amount of the frequency offset may be signalled to the SPS receiver subsystem in data modulated onto the pilot signal in the training signal generator.

The control system of the SPS receiver subsystem may include means for requesting the training signal generator to generate the pilot signal, i.e. to turn it on or off, to increase or reduce its level, or to shift its frequency when not required. In particular, the control system preferably causes the receiver subsystem to operate alternately in a training mode and a searching mode, so that a carrier signal replica generator setting can be established in the training mode, information relating to it can be stored by the control system and then used to generate new settings for use in the search mode for rapid acquisition of SPS positioning signals.

The SPS receiver control system typically includes a processor with program means for performing the training mode and the search mode. The carrier signal replica generator settings used in the search mode typically incorporate offsets to take account not only of any offset introduced by the training signal generator, but also individual frequency offsets in the SPS positioning signals received from different SPS transmitters. Such offsets occur, for instance, as Doppler frequency shifts which may be computed in the control system processor using approximate positioning information already obtained, or using data transmitted from a remote station.

According to a second aspect of the invention, there is provided a method of searching for positioning signals transmitted by a satellite positioning system (SPS) transmitter, the method comprising: using a signal source forming part of a two-way communications subsystem and having a precision reference frequency as a reference to generate a pilot signal; generating a carrier replica signal in a carrier signal replica generator; controlling the carrier signal replica generator to cause the replica signal to become aligned with the training signal; using a setting of the carrier signal replica generator at a time when the replica signal was aligned with the training signal to search for positioning signals transmitted by an SPS transmitter; and, subsequently, controlling the carrier signal replica generator to cause the replica signal to become aligned with the positioning signals.

The invention also includes a computer medium containing a computer program comprising an instruction set for performing the method referred to above.

According to a further aspect of the invention, there is provided a communications system including mobile communication apparatus as described above and a remote station in wireless communication with the mobile apparatus, the remote station including a temperature controlled or temperature compensated precision reference frequency source.

The invention also includes a communications and position-fixing system comprising a communications base station and a mobile station, each said station having a respective receiver and transmitter to provide a two-way radio communication link between the stations, wherein the base station has a precision frequency reference; and the mobile station comprises a reference signal source, means for adjusting the reference signal source to cause it to produce a frequency reference signal calibrated by the precision frequency reference over the said link, a training signal generator arranged to generate an SPS training signal using the calibrated frequency reference signal as a frequency reference, and an SPS receiver arranged to receive SPS positioning signals and having a carrier signal replica generator for generating a replica signal which is a replica of a positioning signal which the SPS receiver is arranged to receive, the SPS receiver further having control circuitry arranged to set the carrier signal replica generator thereby to align the replica signal with the training signal, the SPS receiver being arranged to perform a search for satellite positioning signals using that setting of the replica generator. As outlined above, the training signal may be injected into a front end circuit of the SPS receiver or into an intermediate frequency stage.

According to yet a further aspect of the invention, there is provided a computer program storage medium for configuring a mobile station having a two-way communications subsystem, a position-fixing receiver subsystem, and a training signal generator for generating a pilot signal having the characteristics of an SPS signal, the storage medium storing program means which operate to feed the pilot signal to an SPS signal path in the receiver subsystem, to operate the receiver subsystem to pick up the pilot signal and to align a crier replica signal generated in the receiver subsystem with the training signal, to store an associated setting of a carrier replica generator generating the replica signal, and to initiate a search by the receiver subsystem for satellite positioning signals using the said setting of the carrier replica generator.

A further aspect of the invention includes a mobile transceiver comprising (i) a communications subsystem which is configured to receive a stabilising signal from a remote station and which includes a reference frequency source controllable in response to the stabilising signal, and (ii) a SPS receiver subsystem for receiving and processing SPS positioning signals from remote transmitters forming part of an SPS, the SPS receiver subsystem including a replica signal generator for generating a carrier replica signal which is a replica of an SES positioning signal, a correlator stage for correlating the SPS positioning signals and the replica signal to determine the position of the transceiver, and a control system for controlling the replica signal generator; wherein the communications subsystem includes a training signal generator for generating a training signal of a frequency such that the training signal can be received by the SPS receiver subsystem via coupling between the two subsystems, the training signal generator being coupled to the reference frequency source in a manner such that the training signal frequency is linked to a frequency of the reference frequency source, and wherein the control system of the SPS receiver subsystem is operable in a training sequence to cause the carrier replica signal to be aligned with the training signal and to store information relating to a setting of the replica signal generator at which alignment was achieved, and in a search sequence to cause the SPS receiver subsystem to search for the SPS positioning signals using replica signal generator settings based on said stored information.

Embodiments of the invention will now be described, by way of example, with reference to the accompanying drawings, in which.

Figure 1:
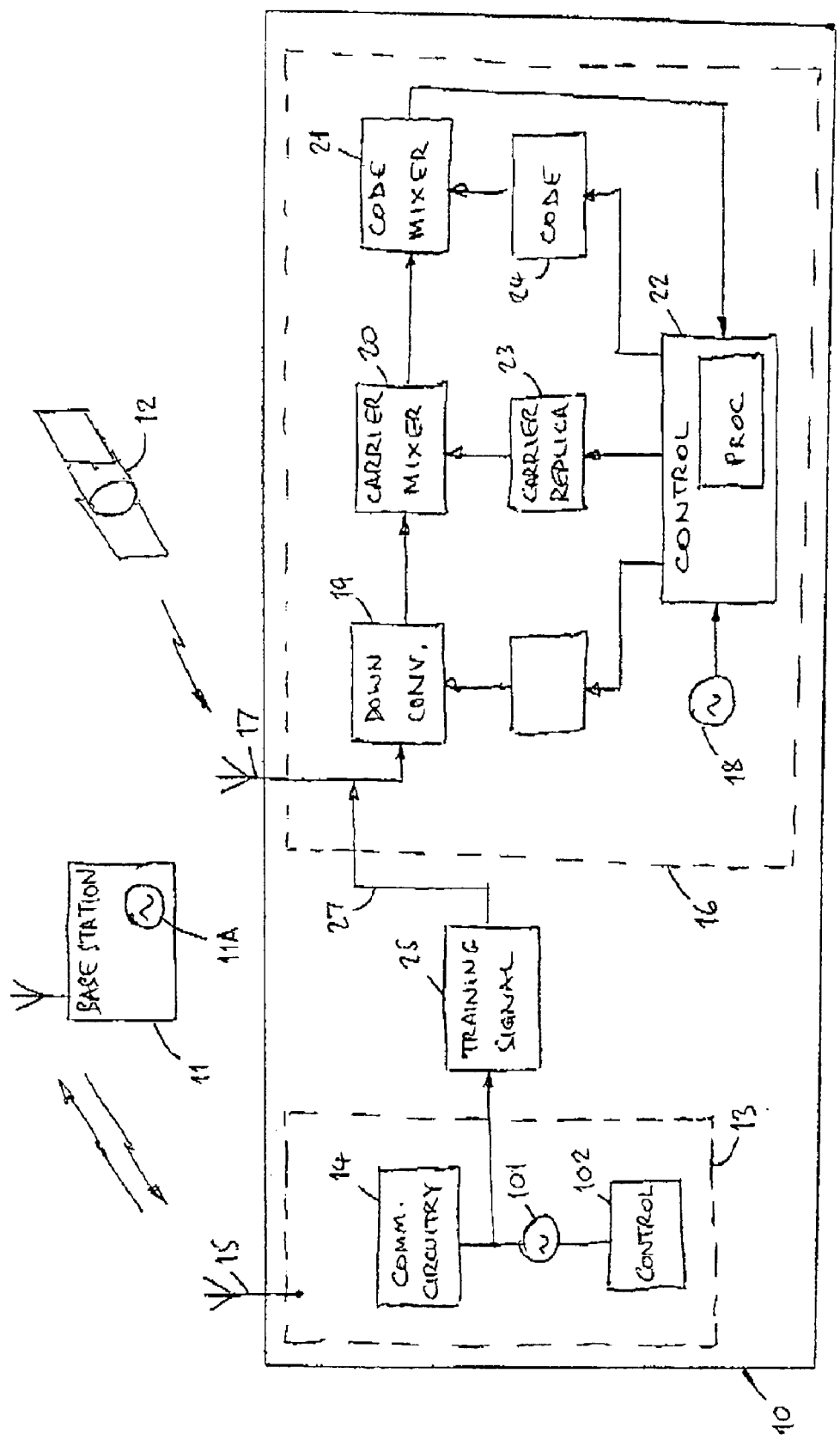
FIG. 1 is a schematic diagram of a system embodying the invention.

Referring to FIG. 1, a mobile communication and positioning device 10 is in communication with a base station (BS) 11, forming part of a cellular radio system, and is able to receive signals from a satellite, such as a GPS satellite 12. The BS 11 includes a fixed reference oscillator 11 A. The fixed reference oscillator 11 A may be one whose frequency-determining element is an atomic standard, such as a caesium beam, rubidium gas or hydrogen gas element, or a quartz-controlled oscillator. If the frequency controlling element is quartz, the vibrating element and its maintaining amplifier may be mounted in a temperature controlled environment.

The mobile device 10 includes a two-way communications subsystem 13, which includes a mobile reference frequency oscillator 101, an oscillator control device 102, communication circuitry 14 and an antenna 15.

The mobile device 10 also includes an SPS receiver subsystem 16 for position-fixing, which subsystem includes an SPS antenna 17, an SPS receiver reference oscillator 18 and a signal path including a down-converter 19, a carrier mixer 20 and a code mixer 21. Components in the signal path receive and process SPS signals received via the SPS antenna 17. The SPS receiver subsystem 16 also includes a control device 22, a carrier signal replica generator 23 and a code generator 24.

The oscillator control device 102 in the communications subsystem 13 may include a phase lock loop, a frequency lock loop or a simple calibration system. Such an arrangement may be analogue or digital, and may result in a small, known frequency offset. The reference frequency oscillator 101 is controlled by the control device 102 such that it oscillates at a frequency stabilised with respect to the fixed reference oscillator 11A in the BS 11 so that it becomes a stable, precision reference oscillator.

The SPS receiver subsystem 16 thusfar described is conventional.

The mobile device 10 also includes a training signal generator 25 for training the SPS receiver subsystem 16 to acquire SPS signals efficiently. The training signal generator is described below with reference to FIG. 2. A coupling 27 links an output of the training signal generator 25 to the above-mentioned signal path of the SPS receiver subsystem. Here, the coupling is a conducting link, but coupling between the pilot signal generator 25 and the SPS receiver subsystem signal path may be simply capacitive or inductive in the sense that the proximity and layouts of the pilot signal generator output and the SPS receiver subsystem signal path, and the magnitude of the pilot signal, are such that the pilot signal is picked up by components of the signal path.

Figure 2:
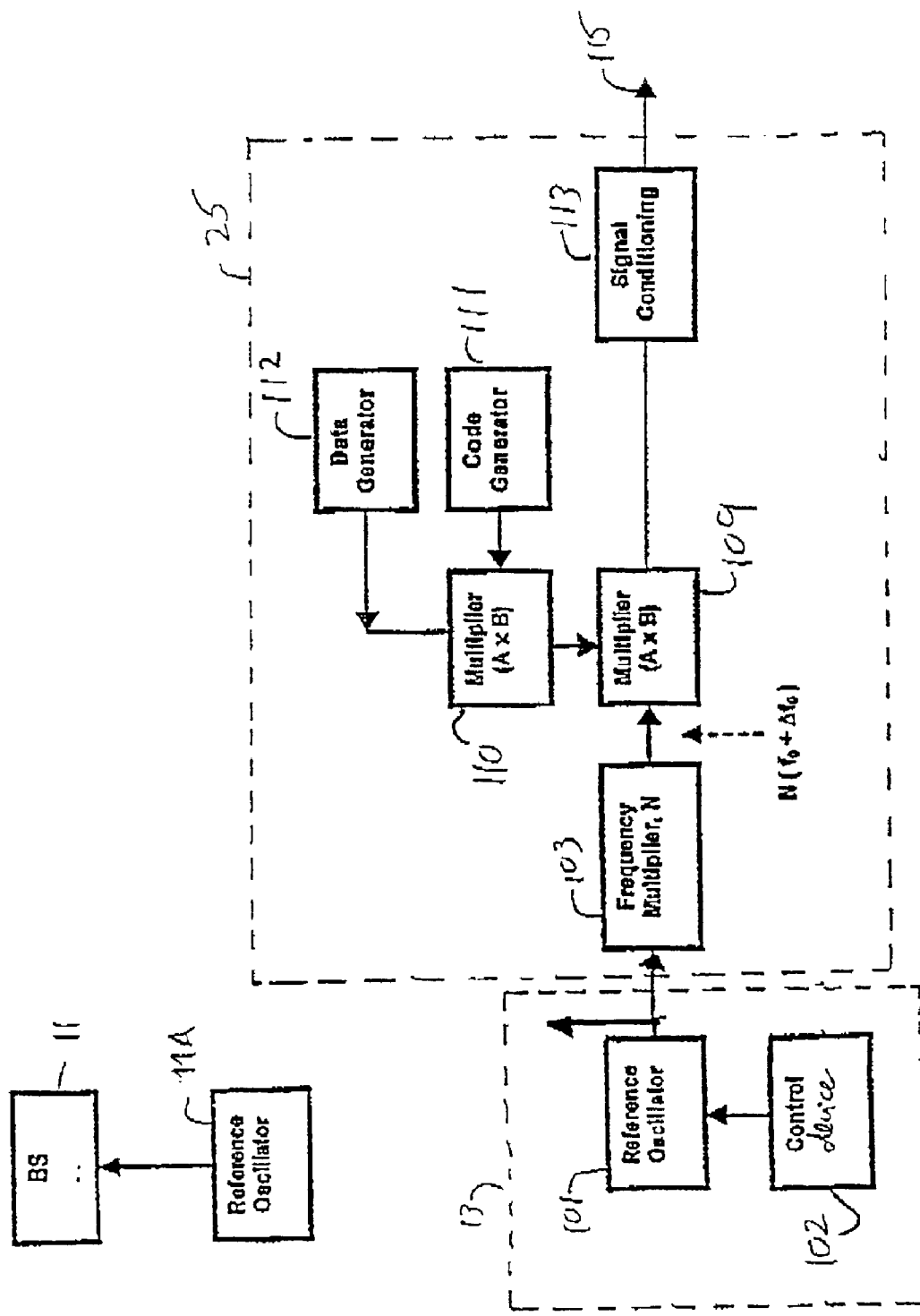
FIG. 2 is a more detailed schematic diagram of part of the system of FIG. 1, including a training signal generator.

Referring to FIG. 2, an output of the mobile reference frequency oscillator 101 provides a signal having a frequency $(f_o+\Delta f_o)$, where $\Delta f_o$ is the optional frequency offset. This signal is used by hardware components of the communications subsystem 13, and is also provided to the training signal generator 25 which provides a pilot signal.

In the training signal generator 25, a frequency multiplier 103 receives the output of the mobile reference frequency oscillator 101 and provides a signal having a frequency $N(f_o+\Delta f_o)$ to a multiplier 109. A second input of the multiplier 109 receives a signal formed by multiplying the output of a data generator device 112 with the output of a code generator device 111 in a second multiplier 110. The multipliers 109, 110 may be binary phase modulators, The pilot signal is produced to be at a level comparable to, or, preferably, higher than the levels normally associated with positioning signals in order that the pilot signal may be easily acquired by the SPS receiver circuitry via the coupling 27 (FIG. 1) with a good signal-to-noise ratio.

The amount of the frequency offset may be known at the time of design or test of the SPS receiver 16, and stored in a memory of the receiver. Alternatively, the frequency offset could be transmitted in data from the data generator 112, which data is used to modulate the training signal carrier. In GPS, the data is modulated using BPSK at 50 bps.

The form of the data generator device 112 and the code generator device 11 depends on the modulation characteristics of the positioning system being used. For the case of GPS, the code generator device 11 preferably generates one of the codes the use of which has been specified in ICD-GPS-200, although this is not essential. The code is preferably a 1023-bit long code. Filtering and amplification of the signal provided by the multiplier 109 is performed by a signal conditioning device 113, connected between the multiplier and an output 115. The result is a pilot signal having a frequency equal to the frequency of the GPS L1 carrier signals, BPSK modulated with a GPS code and GPS-type data. Alternatively, the frequency of the pilot signal is offset from the L1 carrier signal frequency by $N\Delta f_o$.

The training signal generator 25 may require modification for use with a positioning subsystem designed to receive signals from satellites other than those of the GPS constellation. For example, the multipliers 109, 110 may need to be replaced by suitable devices where modulation other than binary phase shift keying (BPSK) is used. In one embodiment, the pilot signal is not modulated, but is simply a square wave or sine wave signal.

In an alternative embodiment, the frequency multiplier 103 generates a digital signal at a sub-harmonic of the frequency of the SPS positioning signals or of a frequency near to the frequency of the SPS positioning signals This sub-harmonic may be a precise or approximate odd sub-multiple of the frequency of the SPS positioning signals. The multiplier 109 may then take a simple form, depending on the modulation system used by the SPS satellites 12. BPSK modulation at an odd sub-multiple results in BPSK modulation at the SPS signal frequency.

Figure 3:
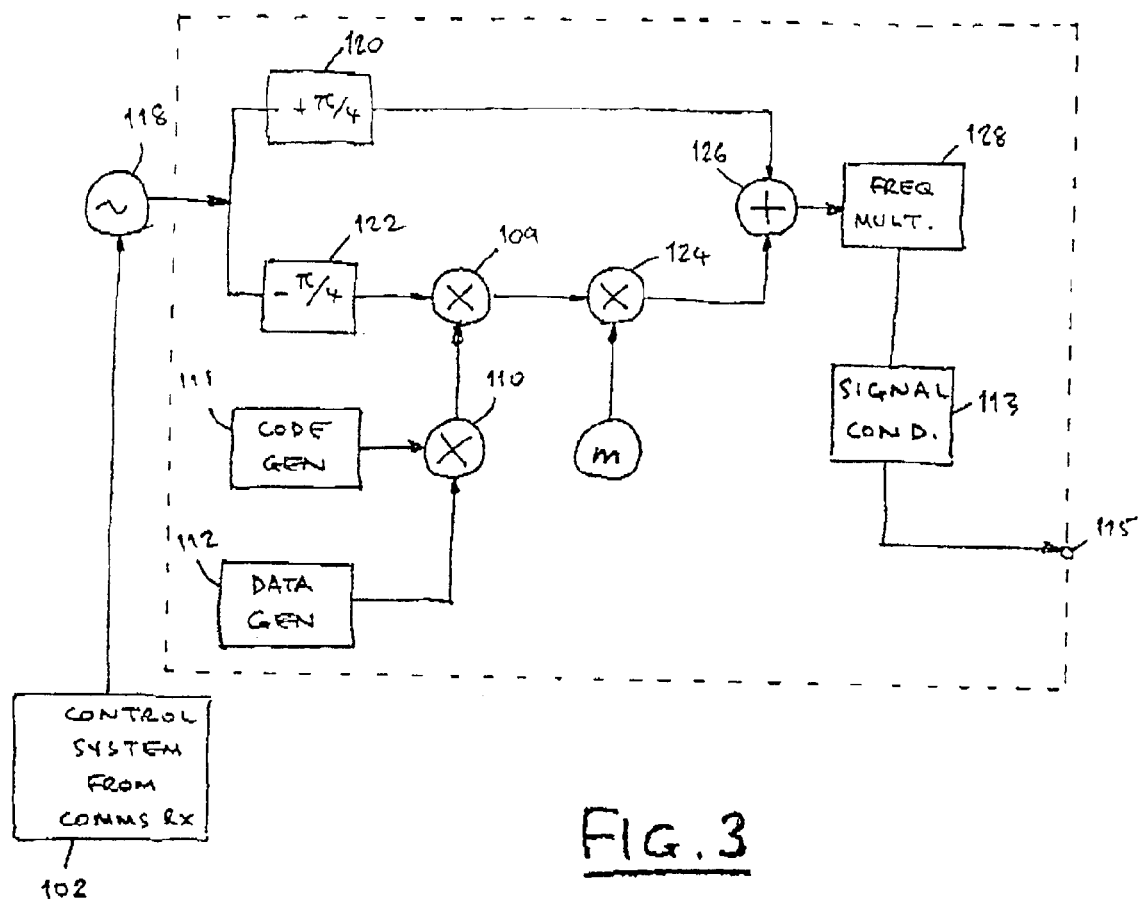
FIG. 3 is a schematic diagram of a system including an alternative training signal generator.

Referring to FIG. 3, in another alternative embodiment, a frequency source 118 (which may be a reference oscillator controlled by the control system of the communications receiver subsystem, as shown) provides two outputs in phase quadrature at a submultiple of the frequency of the SPS positioning signals. In the illustrated example, such outputs are generated by using positive and negative $\pi/4$ phase shifters 120, 122.

One of the two quadrature outputs is multiplied in multiplier 109 with the multiplied outputs of the code generator 111 and the data generator 112 to produce, in this example, a BPSK signal which is then fed to a further multiplier 124 which sets the amplitude of the modulation components according to a parameter m. The resulting signal is fed to one input of an adder 126, the other input of which receives, in effect, a carrier signal from the phase shifter 120 so as to produce at the output of adder 126 a phase-modulated signal having a modulation angle which is determined by the relative amplitudes of the two components. The parameter m is adjusted to set the amplitude of the phase modulation so that when the signal produced by the adder 126 is multiplied in frequency by frequency multiplier 128, the correspondingly multiplied modulation phase angle components have a predetermined phase angle amplitude as required for the pilot signal. The pilot signal appears at the pilot signal generator output 115 after signal conditioning in signal conditioner 113.

In order to acquire the pilot signal, the SPS receiver 16 first selects the modulation code in use by the training signal generator 25, and selects a suitable tuning frequency range.

Figure 4A:
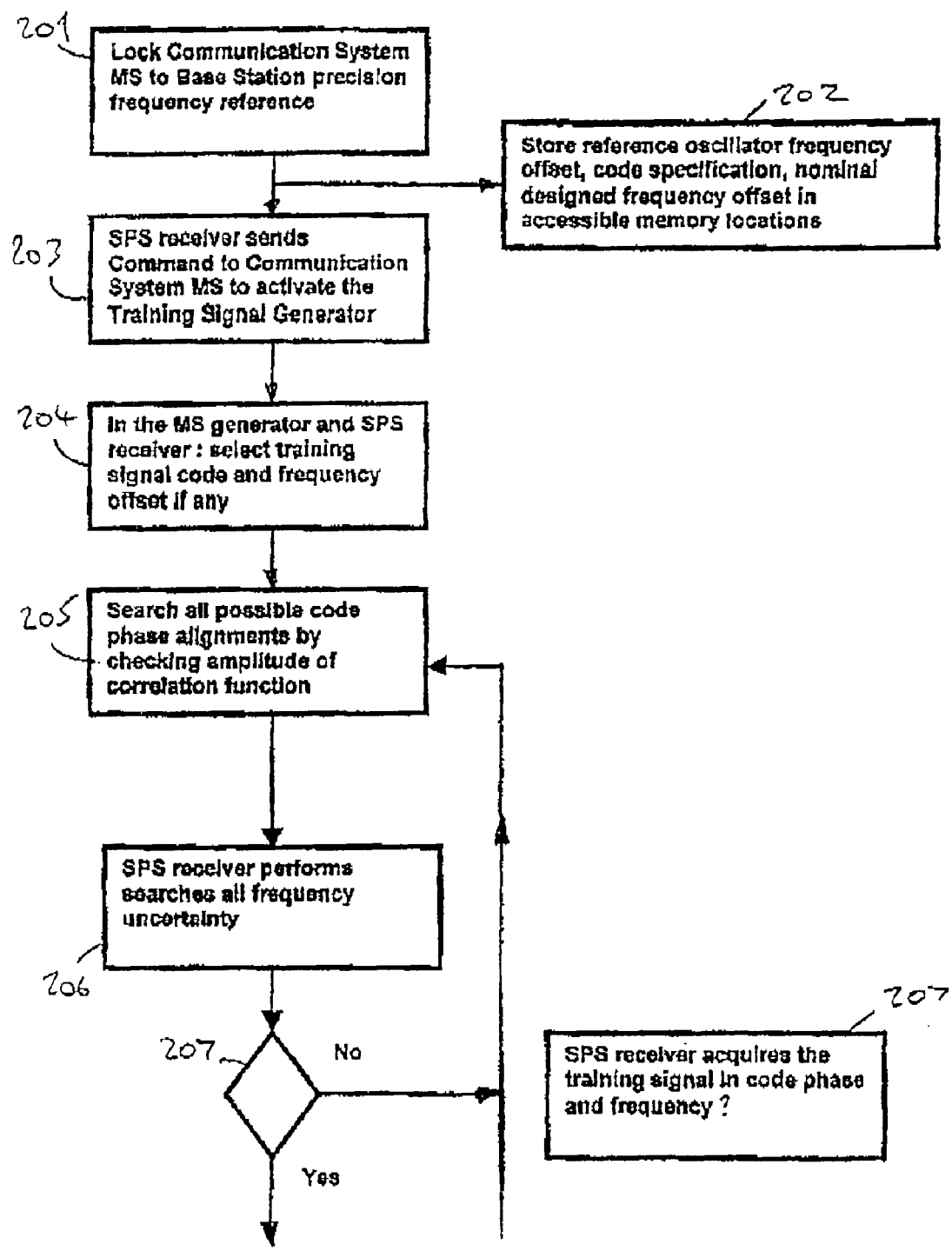
FIG. 4 is a flow diagram illustrating operation of part of the system of FIG. 1.
Figure 4B:
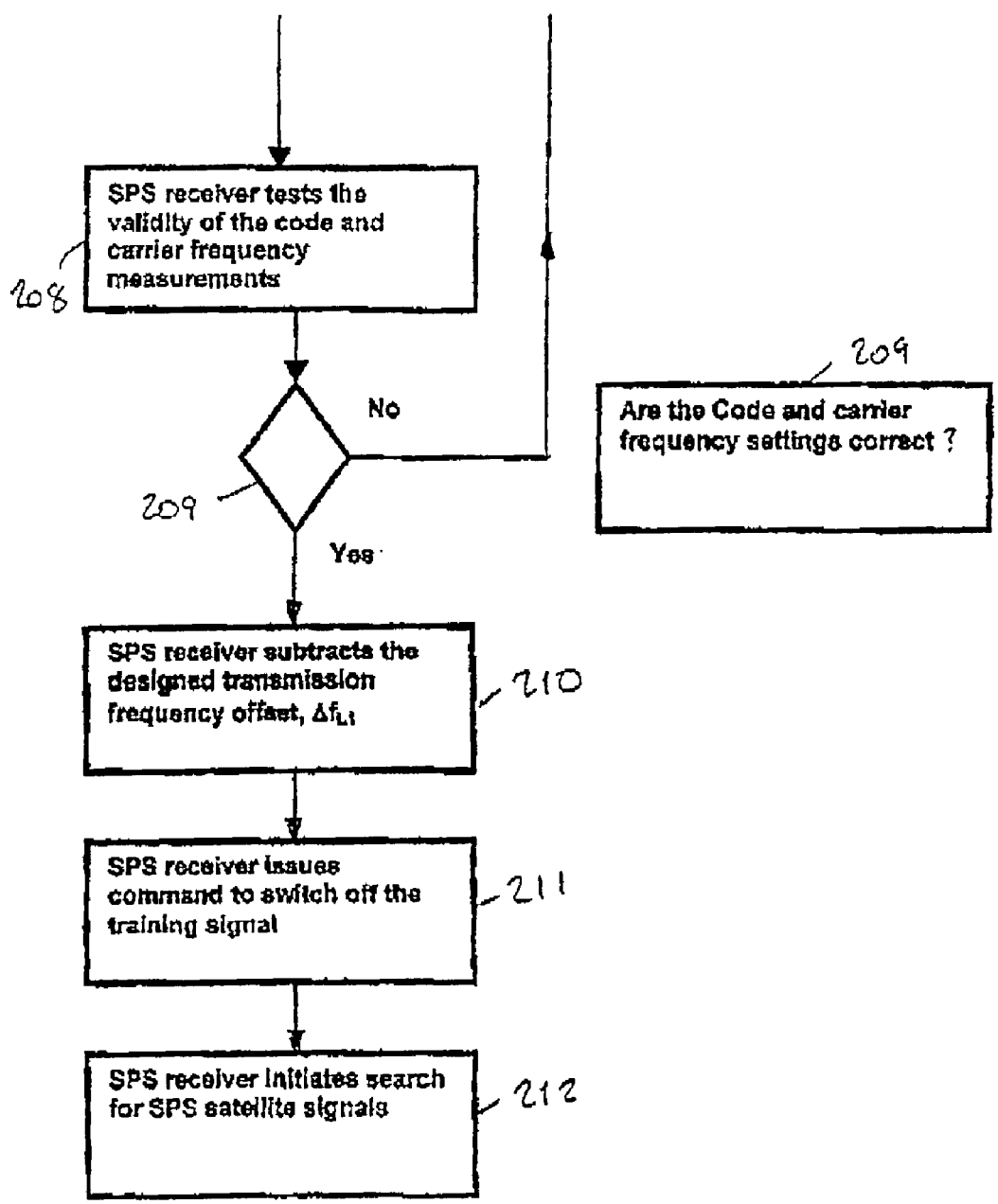

FIG. 4 is a flow diagram setting out the sequence of steps that the mobile apparatus 10 takes in searching for and tracking the signal from the training signal generator 25. These steps may be embodied in a computer program which is run in a processor forming part of the mobile apparatus or, specifically, to the SPS receiver subsystem 16. The program itself may be initially introduced from a compact disk (CD ROM) or another physical storage media, or downloaded over a communication link e.g. from the Internet.

In step 201, the two-way communication subsystem 13 arranges for the precision reference oscillator 101 to be locked to the reference oscillator 25 in the BS 11. At step 202, any frequency offset is stored in a memory location accessible also to the SPS receiver subsystem 16. Additional information which may also be stored in the accessible memory locations is the definition of the code sequence and the formats of any data messages modulated onto the training signals When the SPS receiver subsystem 16 initiates a search for SPS positioning signals, it first sends a command at step 203 to the training signal generator 25, in order to prompt it to generate a pilot signal. In step 204, the SPS receiver 16 obtains from the memory locations mentioned above any information about the code modulated onto the pilot signal, and any designed frequency offset. These characteristics are set in the replica code and carrier generators 23, 24 of the SPS receiver 16. In step 205, the SPS receiver searches for code phase alignment between the replica code generator 24 and that of the pilot signal. In step 206, the receiver searches for carrier frequency alignment The searches of steps 205 and 206 may be carried out serially or simultaneously, or a combination thereof, depending upon the hardware and software resources made available to the signal search process. The processes involved in steps 205 and 206 are iterative and continue until step 207 determines that the carrier replica generator 23 is aligned with the pilot signal. In step 208, quality tests are performed to check that the correct code phase and carrier frequency have been chosen. The tests on code phase usually involve checking that the amplitude of the correlation peak (between a replica code signal and the pilot signal) is nearly correct. The tests on the carrier frequency may embrace tests at nearby aliased frequencies to confirm that the correlation peak is maximised at the chosen carrier frequency. Usually, such further checking involves considering the code phase and carrier phase elements of the pilot signal and testing for compatibility between the frequencies of these parameters. Possible nearby aliased carrier frequencies are also checked to measure the signal strength. If the correct replica signal has been generated, all other checks will give lower signal levels. By choosing the largest signal from the training signal generator, all possible aliased signals are dismissed. At step 209 the decision is taken that the correct measurements of code phase and carrier frequency have been made. In step 210, the tuning error made by the SPS receiver 16 at the transmission frequency is corrected for any frequency offset by subtracting $N\Delta f_o$. At step 211, the SPS receiver subsystem 16 issues the command to cause the training signal generator 25 to stop production of the pilot signal. At step 212, the SPS receiver subsystem 16 initiates a search for SPS satellite signals having regard to the detected tuning error.

The SPS receiver subsystem 16 does not compare the frequency of the carrier signal replica generator 23 with the frequency of the oscillator 18, nor does it perform any measurement of the frequency of the carrier replica signal generator. Instead, the SPS receiver 16 initiates the search for satellite signals in a frequency band which is centred on the frequency of the carrier replica signal generator 23, or any offset therefrom. This allows compensation for the tuning error of the SPS receiver 16 without any measurement of it or any calibration of the oscillator 18. This provides the SPS receiver with the approximate frequency at which positioning signals transmitted from satellites are likely to be found, without the processing of satellite signals. The SPS receiver is informed where subsequently to search for satellite signals by way of tuning commands.

The tuning commands may additionally compensate for estimates of the expected satellite and/or user motion induced Doppler frequency offsets. These are computed using an approximate location for the SPS receiver and for one or more of the satellites involved in the signal search. The approximate satellite location may be computed from knowledge of the ephemeris and/or almanacs of these satellites, and an estimate of the local time at the receiver. In the GPS system configuration, ground-based receiver errors cause Doppler frequency estimation errors at the rate of approximately 0.9 Hz per kilometer of location error.

In a further embodiment of the invention, the pilot signal is not fed to the SPS receiver subsystem through its antenna port as shown in FIG. 1, but through a special input port designed to accept the training signal. For example, the special input port may be at the input to an intermediate frequency amplifier (not shown) interposed between the down converter 19 and the carrier mixer 20. This has the benefit of simplifying the training signal generator 25. The signal level required at the special input port may be higher than the level required if the pilot signal were applied through the antenna port. Such signals may be easier to attenuate than RF signals. With this embodiment, the observed tuning errors for the SPS receiver 16 using the pilot signal do not account for the frequency errors of local oscillators (not shown) upstream of the point of insertion of the pilot signal. Those skilled in the art will be able to deduce from the frequency plan of the SPS receiver subsystem what tuning frequency corrections are required following the tuning error measurement.

The provision of the program means in the control system of the SPS receiver subsystem to command the training signal generator to start and stop generation of the training signal or pilot signal has the advantage that an accurate setting for the carrier replica generator can be obtained with a good pilot signal signal-to-noise ratio without degrading the sensitivity of the SPS receiver subsystem when it is searching for SPS positioning signals. A similar effect can be obtained by attenuating the pilot signal, or otherwise reducing its received level, during the searching mode. As a further alternative, rather than being increased and reduced in level, the pilot signal frequency may be altered during the searching mode to prevent interference with the positioning signals.

What is claimed is:

1. Mobile communication apparatus having a position-fixing capability, wherein the apparatus comprises:
    a two-way communications subsystem having a first signal source for producing a signal having a precision reference frequency;
    a training signal generator for generating a pilot signal at an output thereof, the training signal generator having an input coupled to an output of the first signal source so that the pilot signal is linked to the reference frequency; and a satellite positioning system (SPS) receiver subsystem comprising:
at least one signal path;
a coupling between the signal path and the training signal generator output;
an antenna for applying to the signal path positioning signals received from SPS transmitters;
a carrier signal replica generator for generating a replica signal being a replica of a positioning signal received from an SPS transmitter; and
a control system operable to cause the carrier signal replica generator to bring the replica signal into alignment with the pilot signal when the pilot signal is received by the SPS receiver subsystem and to store information representative of a setting of the replica generator occurring at the time of said alignment;
the control system being further operable to cause the SPS receiver subsystem to search for positioning signals transmitted by a said SPS transmitter according to said setting information.

2. Mobile apparatus according to claim 1, in which the pilot signal is modulated with a modulation signal of a type modulated onto the positioning signals to be received by the SPS receiver subsystem, the modulation signal comprising at least one of data and a spreading code.

3. Mobile apparatus as claimed in claim 1, in which the training signal is a radio frequency signal at a frequency at least approximately equal to the frequency or frequencies of SPS positioning signals to be received by the SPS receiver subsystem.

4. Mobile apparatus as claimed in claim 1, wherein the SPS receiver subsystem includes a frequency downconverter for converting received positioning signals to an intermediate frequency and wherein the pilot signal is generated at a frequency at least approximately equal to said intermediate frequency.

5. Mobile apparatus as claimed in claim 3, in which the pilot signal includes a signal having a frequency offset from a transmission frequency of the SPS positioning signals by a predetermined amount.

6. Mobile apparatus as claimed in claim 4, in which the pilot signal includes a signal having a frequency offset from a typical frequency of the positioning signals after downconversion to the intermediate frequency by a predetermined amount.

7. Mobile apparatus as claimed in claim 5, in which data representing the amount of the frequency offset is modulated onto the pilot signal.

8. Mobile apparatus according to claim 1, in which the control system of the SPS receiver subsystem comprises means to request the training signal generator to generate the pilot signal.

9. Mobile apparatus according to claim 8, in which the pilot signal is modulated with a modulation signal of a type modulated onto the positioning signals to be received by the SPS receiver subsystem, the modulation signal comprising at least one of data and a spreading code.

10. Mobile apparatus according to claim 8, in which the pilot signal is modulated with a signal of a type modulated onto the positioning signals to be received by the SPS receiver subsystem.

11. Mobile apparatus according to claim 8, in which the training signal is a radio frequency signal at a frequency at least approximately equal to the frequency or frequencies of SPS positioning signals to be received by the SPS receiver subsystem.

12. Mobile apparatus according to claim 8, wherein the SPS receiver subsystem includes a frequency downconverter for converting received positioning signals to an intermediate frequency and wherein the pilot signal is generated at a frequency at least approximately equal to said intermediate frequency.

13. A method of searching for positioning signals transmitted by a satellite positioning system (SPS) transmitter, the method comprising:
using a signal source forming part of a two-way communications subsystem and having a precision reference frequency as a reference to generate a pilot signal;
generating a carrier replica signal in a carrier signal replica generator;
controlling the carrier signal replica generator to cause the replica signal to become aligned with the pilot signal;
using a setting of the carrier signal replica generator at a time when the replica signal was aligned with the training signal to search for positioning signals transmitted by an SPS transmitter; and
subsequently, controlling the carrier signal replica generator to cause the replica signal to become aligned with the positioning signals.

14. A method as claimed in claim 13, further comprising modulating the pilot signal with a modulation signal of a type modulated onto positioning signals transmitted by the SPS transmitter, the modulation signal comprising at least one of data and a spreading code.

15. A method as claimed in claim 13, in which the pilot signal is deactivated during said searching for positioning signals transmitted by an SPS transmitter.

16. A method as claimed in claim 14, in which the pilot signal is deactivated during said searching for positioning signals transmitted by an SPS transmitter.

17. A method as claimed in claim 13, in which the step of using said signal source as a reference involves taking into account a predetermined frequency offset.

18. A method as claimed in claim 17, further comprising modulating the pilot signal with data indicative of the predetermined amount of offset.

19. A method according to claim 13, in which the pilot signal includes a radio frequency signal having a frequency at least approximately equal to the transmission frequency of said positioning signals.

20. A method according to claim 13, in which said positioning signals are down converted to an intermediate frequency and the carrier signal replica generator is so controlled that the replica signal is caused to become aligned with the down converted positioning signals, and in which the pilot signal includes at least a component having a frequency at least approximately equal to said intermediate frequency.

21. A method according to claim 19, in which the pilot signal includes a signal having a frequency offset from a transmission frequency of the SPS positioning signals by a predetermined amount.

22. A method according to claim 20, in which the pilot signal includes a signal having a frequency offset from a typical frequency of the positioning signals after down conversion to the intermediate frequency by a predetermined amount.

23. A method according to claim 13, wherein the step of using the carrier signal replica generator setting comprises using stored information representative of that setting to generate at least one new setting of the replica generator for searching for said positioning signals, which new setting is offset from the setting represented by the stored information.

24. A method according to claim 23, including computing the amount of the offset of the new setting.

25. A computer readable medium containing a computer program comprising instructions to perform the method of claim 13.

26. A communications system including mobile communication apparatus according to claim 1 and a remote station in wireless communication with the mobile apparatus, the remote station including a temperature controlled or temperature compensated precision reference frequency source.

27. A communications and position-fixing system comprising a communications base station and a mobile station, each said station having a respective receiver and transmitter to provide a two-way radio communication link between the stations, wherein:

the base station has a precision frequency reference; and the mobile station comprises a reference signal source, means for adjusting the reference signal source to cause it to produce a frequency reference signal calibrated by the precision frequency reference over the said link, a training signal generator arranged to generate an SPS training signal using the calibrated frequency reference signal as a frequency reference, and an SPS receiver arranged to receive SPS positioning signals and having a carrier signal replica generator for generating a replica signal which is a replica of a positioning signal which the SPS receiver is arranged to receive, the SPS receiver further having control circuitry arranged to set the carrier signal replica generator thereby to align the replica signal with the training signal, the SPS receiver being arranged to perform a search for satellite positioning signals using that setting of the replica generator.

28. A system according to claim 27, wherein the carrier signal replica generator is coupled to an oscillator, the replica signal being synthesised by a frequency synthesiser from an output signal from the oscillator, the synthesiser incorporating the setting produced by aligning the replica signal with the training signal.

29. A system according to claim 28, arranged such that the training signal is injected into a front end circuit of the SPS receiver.

30. A system according to claim 28, arranged such that the training signal is injected into an intermediate frequency stage of the SPS receiver.

31. A system according to claim 27, wherein the training signal is modulated with a modulation signal of a type modulated onto the positioning signals to be received by the SPS receiver, the modulation signal comprising at least one of data and a spreading code.

32. A system according to claim 27, wherein the control circuitry of the SPS receiver comprises means to request the training signal generator to generate the training signal.

33. A system according to claim 31, wherein the control circuitry of the SPS receiver comprises means to request the training signal generator to generate the training signal.

34. A computer program storage medium for configuring a mobile station having a two-way communications subsystem, a position-fixing receiver subsystem, and a training signal generator for generating a pilot signal having the characteristics of an SPS signal, the storage medium storing program means which operate to feed the pilot signal to an SPS signal path in the receiver subsystem, to operate the receiver subsystem to pick up the pilot signal and to align a carrier replica signal generated in the receiver subsystem with the training signal, to store an associated setting of a carrier replica generator generating the replica signal, and to initiate a search by the receiver subsystem for satellite positioning signals using the said setting of the carrier replica generator.

35. A storage medium according to claim 34, wherein the program means operate to initiate and terminate a training sequence which includes issuing a command causing the training signal to be activated and a command causing the training signal to be deactivated.

36. A storage medium according to claim 34, wherein the program means operate to alter the frequency of the training signal such that when it is no longer required for aligning the carrier replica signal it does not interfere with reception of the satellite positioning signals.

37. A storage medium according to claim 34, wherein the program means operate to alter the level of the training signal such that when it is no longer required for aligning the carrier replica signal it is reduced in level to an extent such that it does not interfere with reception of the satellite positioning signal.

38. A storage medium according to claim 34, wherein the program means operate to cause a frequency synthesiser setting to be stored in response to alignment of the replica signal with the training signal.

39. A storage medium according to claim 34, wherein the step of using the said setting of the carrier signal replica generator comprises using stored information representative of that setting to generate at least one new setting of the replica generator for searching the said positioning signals, which new setting is offset from said associated setting.

40. A mobile transceiver comprising (i) a communications subsystem which is configured to receive a stabilising signal from a remote station and which includes a reference frequency source controllable in response to the stabilising signal, and (ii) a satellite positioning system (SPS) receiver subsystem for receiving and processing SPS positioning signals from remote transmitters forming part of an SPS, the SPS receiver subsystem including a replica signal generator for generating a carrier replica signal which is a replica of a said SPS positioning signal, a correlator stage for correlating said SPS positioning signals and the replica signal to determine the position of the transceiver, and a control system for controlling the replica signal generator; wherein the communications subsystem includes a training signal generator for generating a training signal of a frequency such that the training signal can be received by the SPS receiver subsystem via coupling between said subsystems, the training signal generator being coupled to said reference frequency source in a manner such that the training signal frequency is linked to a frequency of the reference frequency source, and wherein the control system of the SPS receiver subsystem is operable in a training sequence to cause the carrier replica signal to be aligned with the training signal and to store information relating to a setting of the replica signal generator at which alignment was achieved, and in a search sequence to cause the SPS receiver subsystem to search for said SPS positioning signals using replica signal generator settings based on said stored information.

* * * * *